Dec. 24, 1940.                  C. S. HORNBERGER                    2,225,993
                                     TRAILER
                    Filed Feb. 28, 1939            4 Sheets-Sheet 1

Inventor
Carl S. Hornberger
By Mann, Brown & Co.  Attys.

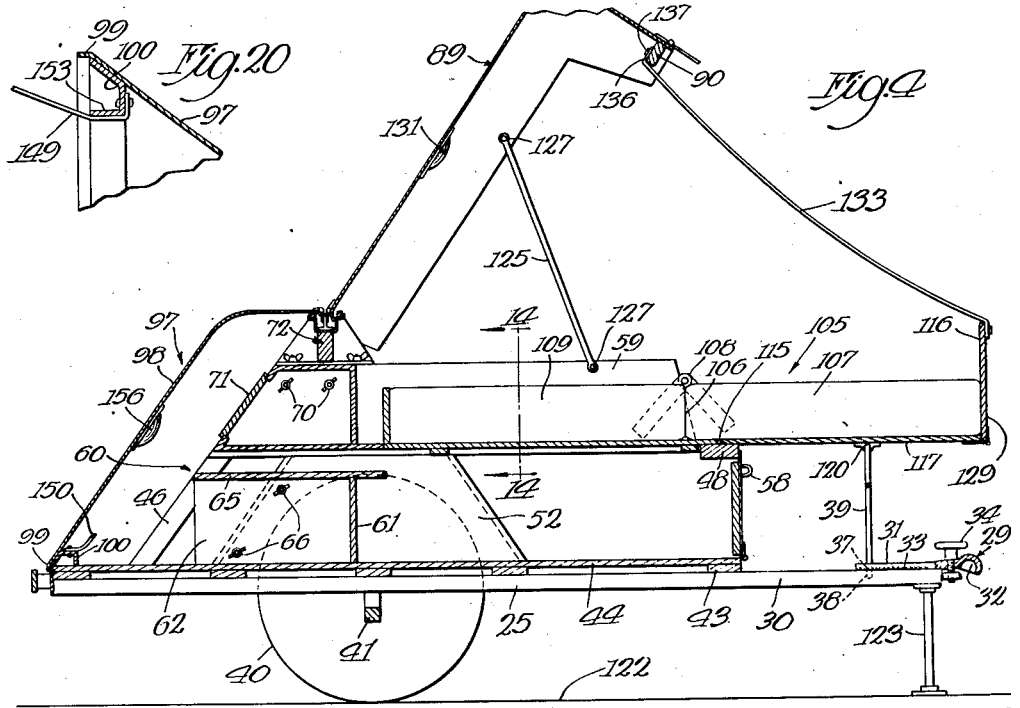
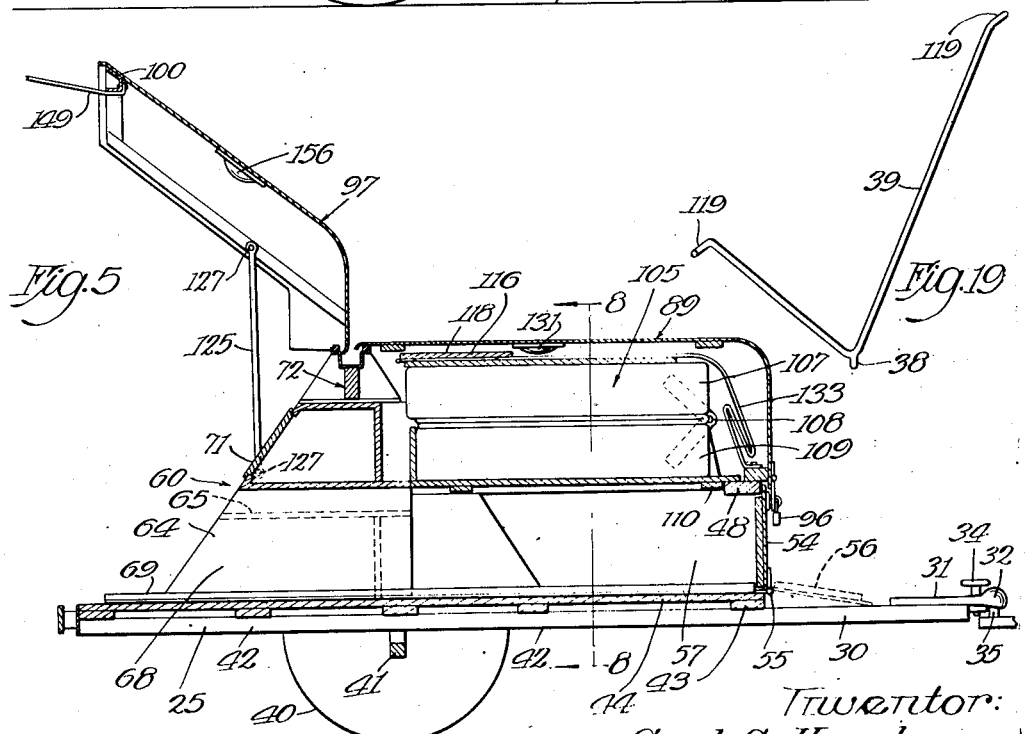

Dec. 24, 1940.   C. S. HORNBERGER   2,225,993
TRAILER
Filed Feb. 28, 1939    4 Sheets-Sheet 3
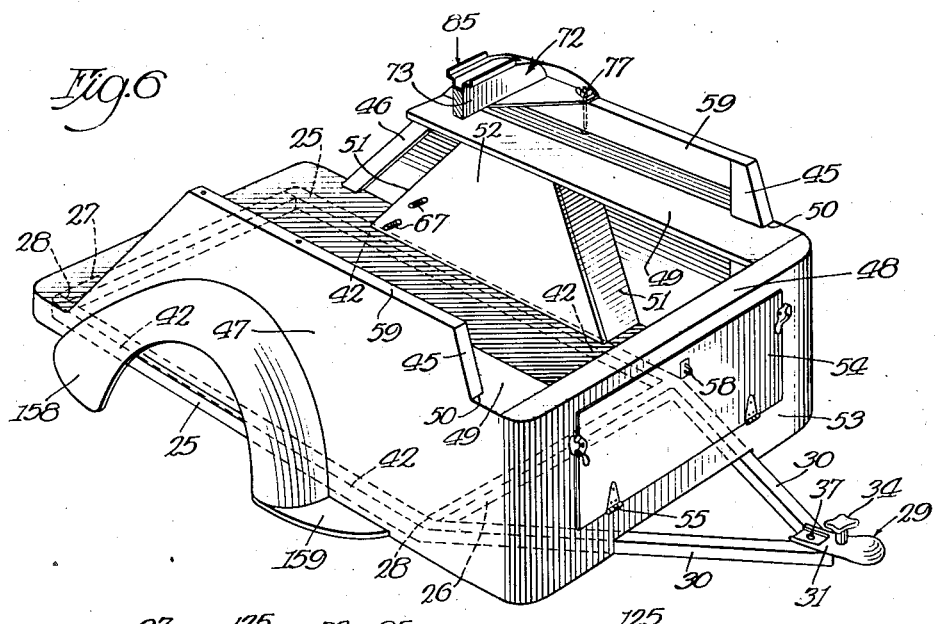
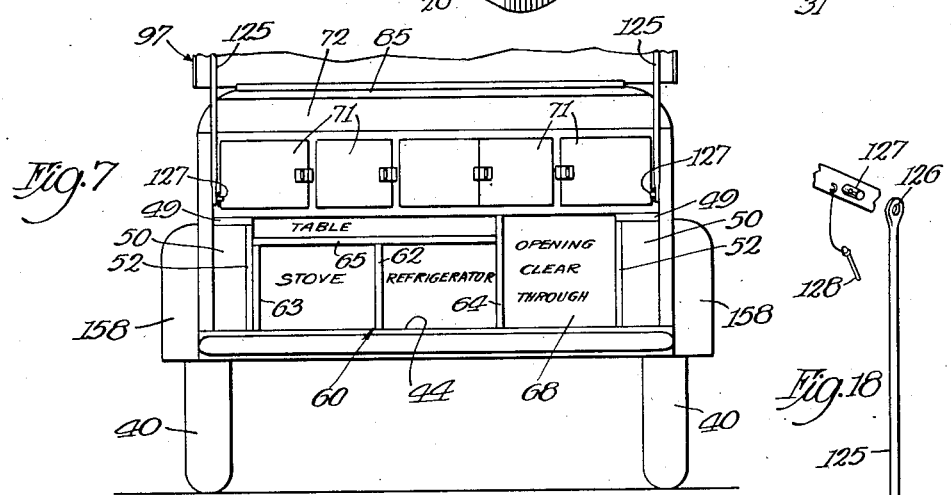
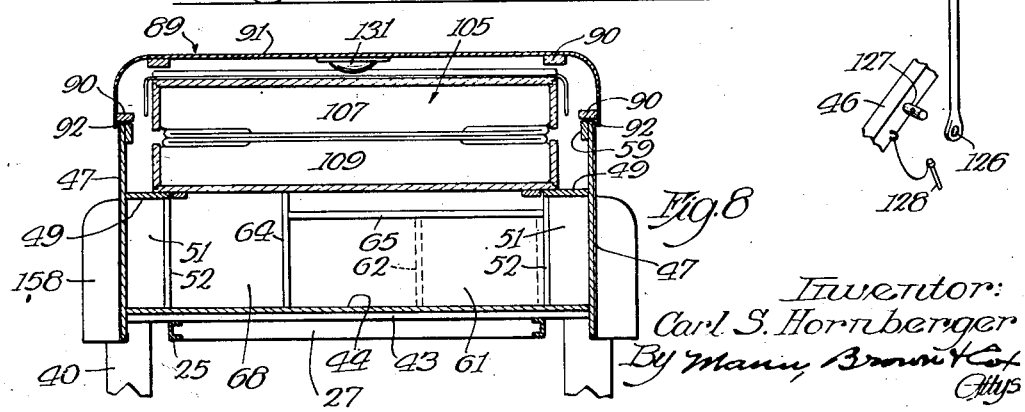
Inventor:
Carl S. Hornberger
By Mann, Brown & Co.
Attys Dec. 24, 1940.  C. S. HORNBERGER  2,225,993
TRAILER
Filed Feb. 28, 1939  4 Sheets-Sheet 4
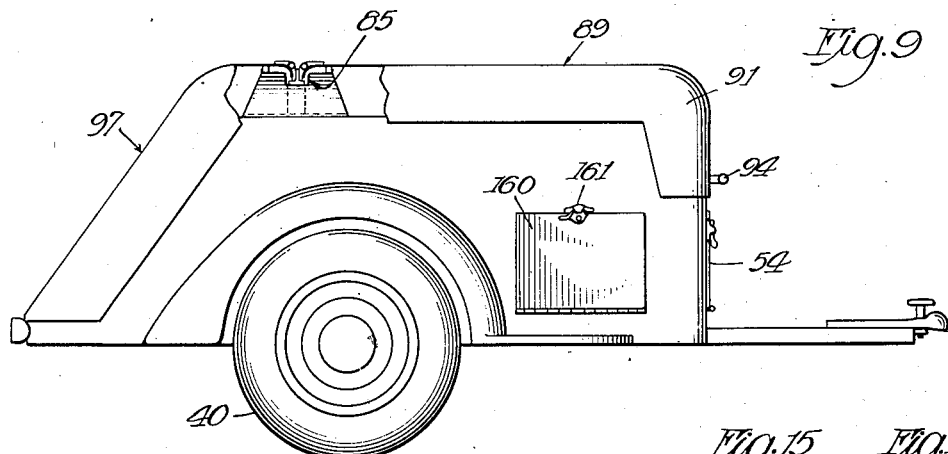
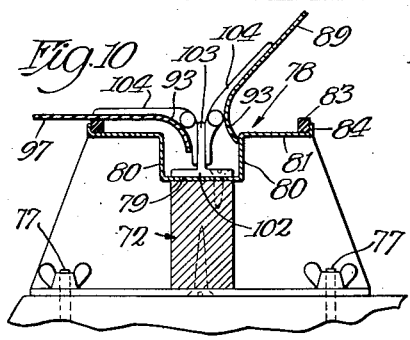
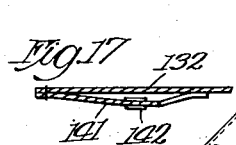
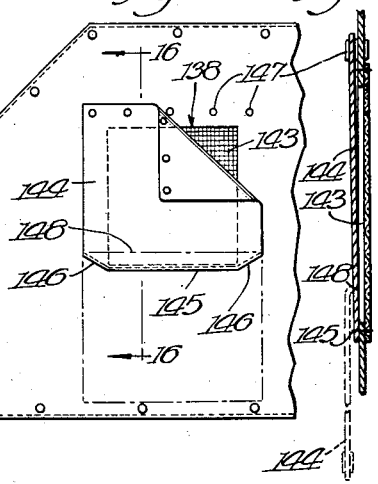
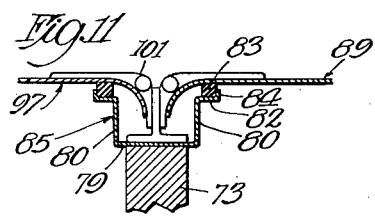
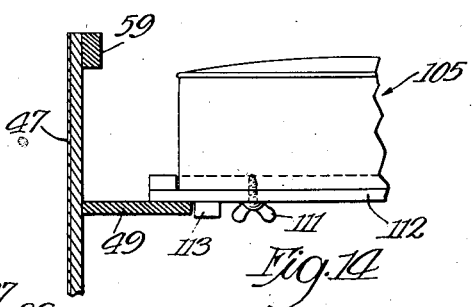
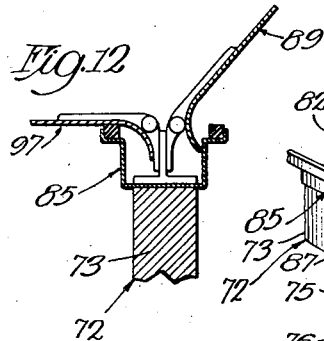
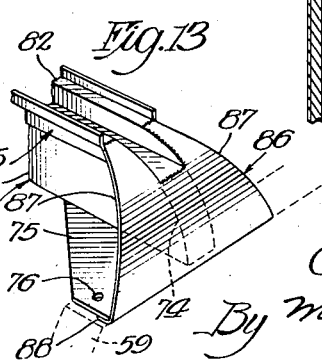
Inventor:
Carl S. Hornberger
By Mann, Brown & Co.
Attys.

Patented Dec. 24, 1940

2,225,993

UNITED STATES PATENT OFFICE 2,225,993

TRAILER

Carl S. Hornberger, Glen Ellyn, Ill.

Application February 28, 1939, Serial No. 258,992

26 Claims. (Cl. 296—23)

It has always been highly desirable in trailers drawn by passenger cars, the subject to which the present invention relates, to conserve space and provide a compact assemblage in which various articles such as food, cooking utensils, sheltering, baggage and sleeping equipment are readily accessible for use and each item is available without disturbing the storage or use of the others.

The present invention incorporates these features in a new and novel way, and the trailer provided is small and light, thus being readily maneuverable with little, if any, drag upon the tow car in traffic.

Not only this, but the trailer of the present invention is low to take curves at high speed without tipping and affords full rear vision to the driver of the tow car.

A further feature of the invention resides in the fact that with minimum movement of assembled parts every comfort and convenience is ready for immediate use and, in event of sudden or violent showers, campers can provide for themselves immediate shelter that is dry and ample. The preparation of meals is greatly facilitated by the completeness and accessibility of the equipment. Furthermore, the living accommodations may be quickly removed and the trailer turned into a flat bed trailer usable for trucking purposes.

Another object of the invention is to provide ample storage space for heavy articles at a low center of gravity and provide ample sleeping quarters high and dry from ground dampness and dew.

A further object is to provide a trailer which is easy and inexpensive to manufacture, own and use yet will stand long and hard usage; a trailer which is readily understood and managed by those unskilled mechanically, and is sturdy in construction, and pleasing of design.

These being among the objects of the present invention, other and further objects will become apparent from the drawings, the description relating thereto and the appended claims.

Referring now to the drawings:

Fig. 4 is a vertical longitudinal section of the trailer as shown in Fig. 2;

Fig. 5 is a vertical longitudinal section of the trailer with the rear deck raised and shows the arrangement of the bedding when the front deck is closed;

Fig. 6 is a perspective view from the front and top of the trailer showing how the trailer may be used as an open bed trailer with the front deck, the rear deck and the food compartments removed;

Fig. 7 is a rear view of the trailer with the rear deck raised to show the arrangement of the food compartments;

Fig. 8 is a transverse vertical section of the trailer taken on the line 8—8 of Fig. 5;

Fig. 9 is a side view of a trailer illustrating another embodiment of the invention partly cut away to show the preferred construction of the transverse channel member to which the front and rear decks are secured;

Fig. 10 is an enlarged section of the preferred means for supporting the front and rear decks, shown in Fig. 9;

Figs. 11 and 12 are sectional views similar to Fig. 10 disclosing another embodiment of the deck supporting means;

Fig. 13 is a perspective view of the end construction of the embodiment illustrated in Figs. 11 and 12;

Fig. 14 is a section taken upon the line 14—14 in Fig. 4 and illustrates how the sleeping mattress may be secured releasably in place;

Fig. 15 is a side elevation of one of the canvas side curtains for the sleeping quarters;

Fig. 16 is a section taken upon the line 16—16 in Fig. 15 showing the window and shade construction;

Fig. 17 is a section taken upon the line 17—17 in Fig. 15 showing the flap construction whereby the curtain, shown in Fig. 15, may be fastened from the inside of the sleeping quarters;

Fig. 18 is a perspective view of the rod means employed for holding the decks in raised position;

Fig. 19 is a perspective view of the supporting yoke employed to support the bed extension on the draft bar; and Fig. 20 is an enlarged section illustrating the manner in which the canopy, shown in Fig. 5, is secured in watertight and airtight relation to the rear deck.

Figure 1:
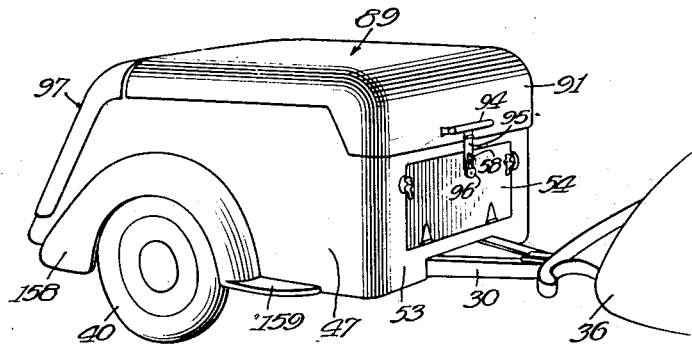
Fig. 1 is a side perspective of a trailer illustrating the preferred embodiment of the invention as it appears when completely closed and ready for transit.

Referring now to the drawings in further detail, the chassis of the trailer, as shown partly in broken lines in Fig. 6, comprises two parallel side frame members 25 secured to each other in spaced relation by a transverse front member 26 and a transverse rear member 27 terminally welded to the side frame members as at 28. Beyond the front member 26, the side frame members are bent to converge well in front thereof where they are secured to a hitch 29 and serve as a draft and weight supporting bars 30.

The hitch 29 comprises a plate 31 die stamped at the front to provide a hemispherical downwardly opening socket 32 (Fig. 4) and welded at the rear to the front ends of the draft bars 30 as at 33. A bolt and clamp assembly 34 carried by the plate 31 cooperates with the socket 32 to secure releasably against dislodgement a ball-beaded stud 35 carried by a tow car 36. A vertical bore is provided in the plate 31 as at 37 to receive a downwardly extending peg 38 upon the yoke 39 employed to support a bed extension as will be described in further detail later.

The wheels 40 are mounted on an. axle 41 (Fig. 5) and are suspended by springs (not shown) and shackled to the side frame members 25 at longitudinally spaced points indicated approximately by the numerals 42. The wheel construction and springs form no specific part of the invention, and consequently it will be appreciated that one or more wheels may be used upon a side of the trailer for support without varying the character of the invention.

Cross beams 43 are secured at spaced intervals to and extend beyond the side frame member 25, and upon these beams the flooring 44 is built with vertical studs 45 adjacent the front corners and rear studs 46 forwardly inclined from the vertical secured thereto. The studs 45 and 46 support the front and side sheathing 47 which is made preferably of stamped metal although other appropriate material may be used.

Between the front and rear studs 45 and 46 the sides run to the full height along beams 59 which join the studs, while between the front studs 45 the front wall, and the portions of the side walls in front of the studs 45 run to a lesser height as determined by a cross beam 48 at the front which is spaced above the flooring 44 to define the front edge of the skeletonized second floor. The second floor includes in addition to the crossbeam 48 longitudinally extending marginal side boards which are cut out to fit around the front studs 45. Towards their rear ends the side boards 49 are supported by convergingly inclined supports 51 which as closed by inside sheathing 52 provides a housing for the wheels where the flooring 44 is cut away around the wheels. The bottom edges of the supports 51 are located over the shackle points 42 and by their inclined position serve in a large measure as rigidifying elements for the whole trailer as well as weight bearing supports for the side boards 49.

The front wall 53 is located rearwardly of the hitch 29 and provided with an outwardly and downwardly swinging door 54 hinged to the front edge of the flooring 44 as at 55. Thus when in its opened position, as indicated in broken lines 56 in Fig. 5, the door 54 is supported by the draft bars 30 to provide a shelf and access may be had to the space 57 between the skeleton floor 49 and the main floor 44 where heavy articles such as suitcases, duffle bags and other traveling equipment may be stored in transit. A staple 58 is provided at the swinging edge of the door 54 for locking purposes.

Figure 3:
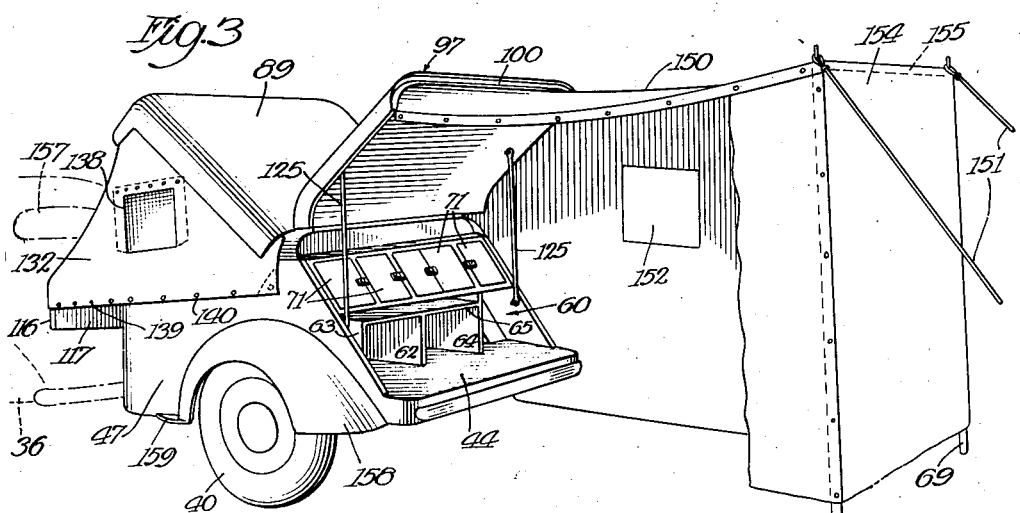
Fig. 3 is a perspective view from the rear of the trailer illustrated in Fig. 1, showing both the sleeping quarters prepared and the rear deck raised with its canopy attached to provide sheltered access to the food compartment of the trailer.

At the rear of the trailer, as shown in Figs. 3, 4 and 7, a stove and refrigerator compartment unit 60 is provided comprising a transverse vertical board 61 of a length substantially less than the distance between the wheel housing 52 and of a height less than the distance between the skeleton and main flooring. A longitudinally disposed partition 62 secured to the transverse board 61 divides the stove and refrigerating compartment while side boards 63 and 64 are secured at the ends of the transverse board 61 to form the outer sides of the stove and refrigerating compartments. The board 64 extends the full distance between the two floors and with a top board 65 nailed on top of the other boards 61 and 63, a space between the second floor and the board 65 is defined to receive a folding table (not shown) of conventional design.

The unit 60 is located against the left hand housing 52 and held in place by winged nuts 66 received on bolts 67 that are carried by the left hand housing 52. This provides a space 68 running the full length of the trailer between the refrigerator compartment and the right hand wheel housing where long articles such as tent poles 69 or sporting equipment may be stored.

Resting on top of the skeleton flooring is a utensil and food compartment unit running the full width between studdings 46 and secured in place by wing headed wood screws 70 driven into the side rails 59. These compartments have rear edges inclined and coplanar with the studding 46 and each compartment is provided with a door 71 which, due to the angle of inclination, will be either completely open or completely shut, which in addition to affording full compartment space, prevents the door hinging from being injured by articles coming into violent contact therewith.

Interconnecting and supported on top of the side rails 59 is a rigidifying beam 72 which supports the sides against sidesway. The beam 72 comprises a member 73 rounded off at its upper end corners as at 74 (Fig. 13). A triangular metal plate 75 is secured to the bottom of the beam with one edge coextensive with the ends of the beam where the plate is apertured as at 76 to receive winged nut and bolt assemblies 77 releasably securing the beam 72 to the side rails 59.

Along the top of the beam 72 a channel member is secured, and in the construction of this channel member lies the difference between the embodiment illustrated in Fig. 10 and the one illustrated in Figs. 11, 12 and 13.

The channel member 78, illustrated in Fig. 10, comprises a horizontal bottom portion 79 connecting upwardly extending sides 80 that terminate in oppositely bent horizontal portions which, in Fig. 10, are quite wide and identified by the numeral 81; in Figs. 11 and 12 are quite narrow as identified by the numeral 82. Felt or rubber seals 83 are secured marginally along slightly upturned edges 84 of the horizontal portions 81 and 82.

The channel member, shown in Figs. 11 and 12, will be identified by the numeral 85 and as constructed at its ends is cut on a surface of revolution continuing the rounded contour 74 of the beam 73, through the walls 80 and up to the horizontal portion 82 at which point the slightly upturned flange 84 and seal 83 end. A flashing 86 following the contour of the cut edges of the channel member 85 with gradually diverging sides 87 is welded thereto and bent downwardly over the end of the beam and under the edge of the plate 75 to be received and held between the plate 75 and the rails 59.

In this way, the flashing not only serves as a strengthening element but also as a water shed for water collected in and flowing from the channel.

In the end construction of the channel member 78 the flashing 86 is eliminated and in a die stamping operation the channel member 78 itself is terminally upset to provide a similar water shed.

Before describing the structural characteristics of the channel members further it would be well to refer, at this time, to the top and rear decks and their constructure.

From the beam 73 forwardly to the front wall, and from side to side, the trailer is covered by a deck unit 89 made of frame members 90 that follow the contour of this portion of the trailer and are covered with a die stamped panel 91 overlapping the upper marginal edges of the sides and front walls, as at 92 (Fig. 8) and the channel member 78 or 85 at the rear, as at 93 (Fig. 10).

A handle 94 is provided at the front for raising the front deck 89 and the hasp 95 cooperating with the staple 58 make it possible to lock and unlock the front door 54 and the front deck 89 at the same time with one lock 96.

The rear deck 97 is similar in construction to the front deck except as to shape. The margins of the die stamped shell 98 overlap the exposed top margins of the inclined rear edges of the sides; also the floor 44 therein at the bottom and the channel member 78 (or 85) at the top. The lower marginal edge 99, however, is reinforced with a substantially U-shaped channel member 100 curved at its ends to follow the contour of the edge. The member 100 performs a two fold purpose; one to strengthen the edge against deformation by blows, and the other to cooperate with canvas secured thereto to provide a support therefor and a gutter, as shown in Fig. 5, for the drainage of water, certain further characteristics relating thereto being described later.

Returning again to the channel members 78 and 85, the edges 101 of the front and rear deck members are curved downwardly into the channel to a point between the walls 80 thereof. An inverted T-shaped member 102 secured against the bottom 79 provides an upright bracket 103 to which hinges 104 are secured to support the front and rear decks. The pivotal axes of the hinges are preferably in the plane of the top face of both decks and in this way, when the decks are raised the downwardly bent edges 101 come into proximity and contact with the walls 80. Otherwise when the decks are down the seals 83 engage the inside face of the edge. Thus when the decks are raised no water can be blown by wind current into the interior as it runs off the decks into the channel member and when the decks are down the interior of the trailer is sealed from road dust and rain.

Figure 2:
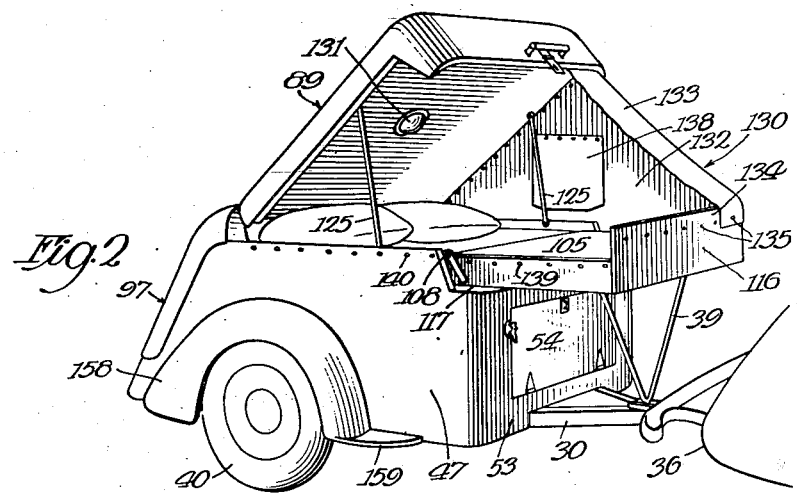
Fig. 2 is a view similar to Fig. 1 in which the sleeping quarters alone are prepared for occupancy during transit or during a stopover without the trailer being unhitched from the tow car.

In this connection it is well to note, as shown in Fig. 2, that the width of the flashing 86 is such as to underlap the edge 101 when the front deck is raised to provide an uninterrupted water shed surface throughout. Furthermore, as seen in Fig. 10, the width of the horizontal portion 81 of the channel member 78 provides a convenient shelf for flash lights, and other articles when either deck is raised.

Occupants sleep lengthwise of the trailer under the front deck and for this purpose a box spring mattress 105 is split transversely as at 106 and one part 107 is pivoted by strap members to fold back upon the other part 109. The part 109 is located within the vertical confines of the skeleton flooring, and may be merely cleated as at 110 (Fig. 5) against horizontal movement, yet removable, or it may be secured in place more permanently by wing headed bolts 111 as shown in Fig. 14, to a secondary floor 112 resting upon the skeleton floor to which it is secured as at 113. However, the structure of most box mattresses renders the use of secondary flooring 112 unnecessary.

The line of severance 106 of the mattress may be varied longitudinally depending upon the desired size of the portion 109, but in the embodiment illustrated in Fig. 4, I prefer that the severance of the cushioning of the mattress be well rearward of the front wall with the severance 115 between the framework of the mattress made closer to the front wall. This arrangement provides space for a well rounded contour on the top front edge of the front deck.

A foot board 116 is hinged to the bottom 117 of the mattress section 107 along the front edge so that it may fold back upon the bottom 117, as shown at 118 in Fig. 5, when the front deck is lowered.

When unfolded, the bottom 117 extends forwardly over the hitch 29 and the V yoke 39, briefly referred to heretofore, is provided with coaxial ends 119 journalled against dislodgement in laterally spaced brackets 120 that are secured to the bottom 117 where they come within a vertical plane passing through the bore 37.

When disconnected from the tow car 36, the draft bars 30 are supported parallel with the ground 122 by an anchoring stanchion 123 (Fig. 4) for overnight stops. This, in combination with the yoke 39, supports the section 107 directly on the ground yet in correct relation to the rest of the mattress and trailer.

This is significant. The support of the bed extension 107 thus incorporates triangular support components for a load placed anywhere upon the extension 117. Five points are involved, the two forward corners of the trailer, the two arms of the yoke 39 and the point where the stud 38 is supported in the bore 37.

For instance if a man were seated upon the right front edge of the mattress section 107, the right front corner of the trailer and the right arm of the yoke 39 would bear the weight. The pivot point 108 on the left side would carry a tension load. The triangle thus established prevents the right front end from being forced down, yet permits the whole extension to be supported at a single point, namely, the juncture of the yoke and the hitch where the stanchion is provided. In event the weight is placed on the left forward corner, the left arm of the yoke 39 and the left forward corner of the trailer bear the weight and the right pivot 108 carries the tensile load imposed upon the assemblage. The result is the same, no corner of the extension is forced lower than another.

Turning again to the front and rear decks 89 and 97, they are supported in their raised position by rods 125 having eyes 126 at both ends which fit over and are keyed to studs 127 by pins 128 (Fig. 18). The height at which the front deck 89 is held by the rod 125 is such that the outer end 129 of the mattress extension 107 will be cleared as it passes back and forth when folding and unfolding the bedding about the pivots 108. The rear deck is held at a height permitting a person to walk in under it and work upon the flooring 44 where it extends rearwardly beyond the stove and refrigerator 60 in the form of a shelf.

An opaque canvas closure 130 is provided to shelter and provide privacy for the sleeping quarters, a lamp 131 connected to a battery being secured under the front deck to furnish light. The canvas closure comprises two triangular side sections 132 stitched to a rectangular section 133. The upper edge of the rectangular section 133 is stretched over the lower rear edge 136 of the frame member 90 as shown in Fig. 4, and secured to the rear face thereof by snaps 137 while the lower edge is secured at the bottom on the outside face and along the upper edges 134 of the footboard 116 by snaps 135. The edges 134 and 136 act as stretch snubbers relieving the snaps of direct strains and keep the canvas from wrinkling, causing it to remain flat and smooth.

The triangular sides are secured marginally along the folding extension 107 as by snaps 139 and along the top edge and rails 59 by snaps 140. The upper edges of the triangular sections are secured upon the inside and marginally along the lower edge of the front deck.

After one has retired and desires to secure all the snaps, it is a comparatively easy matter for this to be done by securing the lower edge last by reaching outside from underneath the canvas edge. This is true until the last and corner snap is reached when it is impossible to reach through and still close the opening needed to manage the snap from the outside.

To take care of this, and referring to Figs. 15 and 17, I provide a triangular piece of canvas 141 upon the inside of the side 132 in a manner forming a pocket. A lock snap member 142 is secured to the pocket piece 141 for the last and corner snap. Then when it comes time to fasten the last snap the hand is inserted in the pocket and the snap is secured. This snap thus may be operated easily from the inside and serves somewhat as a lock against unsnapping since it is inaccessible from the outside.

Windows 138 are provided in the triangular sides and covered with marquisette 143 stitched marginally to the canvas around the opening. A novel shade is provided comprising a flap of canvas 144 cut appreciably wider than the window opening and secured to the canvas along the lower edge in the following manner: The flap 144 and the triangular canvas are laid out flat with the flap disposed over the window 143 and with the lower edge of the flap barely overlapping the edge of canvas at the bottom of the window. The overlapping edges at the bottom of the windows are stitched together as at 145 with the stitches angled upwardly as at 146 where the flap 144 overlaps the canvas 132 beyond the sides of the window opening. The inclined stitching 146 provides water sheds in which rain coming through the marquisette is caught and discharged back through the marquisette at the bottom of the window. Water is thereby kept from reaching the bedding when the flap is closed.

This stitching in no way interferes with opening the window since when the snaps 141, provided at the top to close the window, are released the flap drops and folds back upon itself along a fold line 148 running from the top of one of the inclined stitching 146 to the top of the other providing ample light and ventilation and, moreover, forms a pocket into which combs and other articles may be placed much like a shelf.

When closing the front deck for transit the lower edges of the sides only are unfastened, the extension 107 is folded inwardly, with the footboard 116 ultimately attaining the position 118 shown in Fig. 5, and as the extension is folded the sides 132 are tucked inwardly as far as they will go. Then the front deck is lowered and the rectangular portion 133 of the canvas is drawn over to protect the bedding from dust, as shown in Fig. 5.

It will be appreciated that the length of the supports 125 for the front deck may be varied with variations in the length of the extension 107 so that regardless of the length of canvas needed to cover the bed when it is folded the canvas will be drawn tight automatically when the front deck is raised.

The rear deck 97 has secured to the truss 100 the forward edge 149 of a canopy or tent 150, which remote from the trailer is held by tent poles 69 guyed by ropes 151. The window 152 in the canopy is like the window construction, shown in Fig. 15, and a suitable flap may be provided for entrance and exit.

In understanding the truss 100 and forward edge 149 securement, it is well to note first that very often in stretching canvas to provide a substantially flat roof, depressions occur therein along the margins which catch and hold water. Upon inopportune occasions, this water provides a deluge much to the aggravation of people sheltered under the canvas.

To obviate this danger the U-truss 100 is so constructed and mounted as to face rearwardly with the lower side 153 practically horizontal (see Fig. 20) when the rear deck is raised. The other end 154 of the canvas roofing, as supported by a spanner member 155 interconnecting the poles 69, is preferably higher than the truss 100, whereby water flows toward the truss 100 around the lower side 153 of the truss the canvas is snub stretched and the side 153 thereby imposes upon the canvas a straight contour which, in cooperation with the truss, forms a gutter by which all water is discharged without danger of it collecting in pools on top of the canopy.

In transit, the canopy is stored between the rear deck and the compartment units in the back of the trailer where there is provided enough clearance, as seen in Fig. 4, for this purpose. A light 156 is also provided underneath the rear deck for lighting purposes.

Certain other features of the invention are of interest. The height of the trailer with both decks down for transit is less than an average man's shoulders, a measurement criterion mentioned to show how easily the trailer may be handled by both men and women without any need for reaching upwardly for anything, and also the visibility afforded for rear view vision since this height is generally lower than the rear window 157 of a conventional automobile.

Fenders 158 are mounted over the wheels and their front end steps 159 are provided to assist a person entering or leaving the sleeping compartment. In the construction of the modification shown in Fig. 9, a side door 160 secured by a window lock 161, is provided for ready access to the storage compartment below the sleeping quarters.

Thus, having described various embodiments of the invention, it will be apparent to those skilled in the art that other and further modifications and changes can be made without departing from the spirit of the invention, the scope of which is commensurate with the appended claims.

What is claimed is:

1. In a trailer having two wheels supporting a frame intermediate the ends thereof, side walls thereon, a floor supported by the side walls above the frame and the wheels over a portion of the frame, means for supporting the front of the frame on the ground, a collapsible extension for the floor, and means for supporting the extension on the frame in a position co-planar with the floor.

2. A two wheel trailer comprising two spaced frame members bent and joined at their front ends to provide a draft hitch, side walls supported by the frame, a floor supported a spaced distance above the frame to provide storage space thereunder, a collapsible extension for the floor extending over the hitch, and means for supporting said extension above the hitch.

3. In a trailer having two wheels supporting a frame intermediate the ends thereof and comprising side walls thereon, a floor supported by the side walls above the frame with the major portion thereof disposed in front of the wheels, means for supporting the front of the frame on the ground, a floor construction foldable back upon the floor and means for supporting the floor construction on the frame when unfolded in a position co-planar with floor.

4. In a trailer having two wheels, two spaced frame members joined at their front ends in a hitch, side walls supported by the frames and terminating short of said hitch, a floor supported by the side walls, flooring hinged to the side walls in back of the front edge of the floor and movable to a position over the hitch co-planar with the flooring, and means for supporting said flooring in said position above the hitch.

5. In a trailer having two wheels and side walls disposed substantially in the plane of the wheels and apertured to receive the top portions of the wheels for free movement between the walls and wheels under running conditions, a floor joining the side walls at the bottom and apertured co-extensively with the walls to clear the wheels, a V-span housing over each wheel sealing the borders of the apertures and defining the wheel space, each V-span housing providing a support point spaced from the floor, and an arched frame member interconnecting the top of the side walls at the support points.

6. In a wheeled trailer having side walls disposed substantially in the plane of the wheels and apertured to clear the wheels for relative movement under running conditions, a floor joining the side walls at the bottom and apertured to clear the wheels, an inverted V-span housing supported on the floor at the margins of each of said floor apertures, each V-span providing a support point spaced from the floor over the wheel, and an arched frame member interconnecting the top of the side walls at the support points.

7. In a trailer having a floor and contiguous side and front walls, the combination of an arched frame member extending across from one side wall to the other intermediate the edges of said trailer of a height appreciably less than the shoulders of a man of average stature, and top members hinged to said frame member defining the front, top and rear of said trailer when closed and providing access to the interior of said trailer when raised.

8. In a trailer having a floor, side walls with a sloping rear edge and a low front wall, the combination of an arched frame member extending across from one side wall to the other intermediate the edges of said trailer and of an overall height less than the shoulders of a man of average stature, a domed top hinged to said frame member and marginally following the upper edges of the frame and the side and front walls when closed and a cover hinged to said frame and marginally following said sloping rear edges and the rear edge of the floor when closed, said top and cover defining the front, top and rear surfaces of said trailer and providing access to the interior of said trailer when raised, the frame member being an upwardly opening channel member providing a gutter for the top and cover when they are in raised position.

9. In a trailer having a floor, side walls extending above said floor to define the sides of sleeping quarters and a hitch member extending beyond and below the front edge of said floor, the combination of a frame member, an arched top hinged to the frame member and marginally mating with the upper edges of the side walls and the front edge of said floor in sealed relation, folding means movable from a position over the floor to a position over the hitch member and co-planar with said floor for cooperating with said floor to provide room for a mattress, and means for supporting the folding means relative to said hitch whereby strains on the folding means are borne directly by the hitch, means for holding said top in a raised position to afford room for moving said folding means and forming a rain shed over said floor.

10. In trailer having a floor, side walls extending above said floor to define the sides of sleeping quarters and a hitch member extending beyond and below the front edge of said floor, the combination of a frame member, an arched top hinged to the frame member and marginally mating with the upper edges of the side walls and the front edge of said floor in sealed relation, extension means movable from a position next to the floor to a position over the hitch member and co-planar with said floor for cooperating with said floor to provide room for a mattress, means for supporting the folding means relative to said hitch whereby strains on the folding means are borne directly by the hitch, means for holding said top in a raised and inclined position permitting the movement of said extension means from one position to the other and forming a rain shed over said floor, and fabric means secured under the front edge of said top and to the outer end of said extension means to provide a rain shed over said extension means.

11. In a trailer having a floor, side walls and a low front wall, the combination of a tranverse frame member intermediate the ends, a top hinged to the frame member and defining the top and front contour of said trailer, the top being raised to a supported position to provide an inclined shelter for the front of the trailer and sleeping quarters thereunder, a second top hinged to the frame member and constituting the rear deck of the trailer when closed, the second top being raised to a supported position to afford a shelter and access to the space thereunder, the frame member serving as a water trough for rain shed from the tops when they are in raised position.

12. In a trailer having a hinged top, a channel member having a horizontal edge portion providing a shoulder, a hinge member secured on said channel member, a second hinge member supporting the top a distance above the shoulder when closed, said hinge members accommodating movement of the top and maintaining the edge thereof within a vertical projection of the channel member throughout movement of the top through a major portion of an acute angle, and means between the top and the shoulder for sealing them when the top is closed.

13. In a trailer having sides and hinged tops, an upwardly opening arched channel member connecting the sides and widening at its ends, a butt hinge member supported in the channel of the channel member, plate hinge members supporting the tops with the marginal edges of the tops proximate each other and within the confines of the channel member throughout movement of the tops through major portions of acute angles.

14. In a trailer having spaced floors providing storage space between them, side walls extending above the upper floor to define the sides of sleeping quarters, a hitch member extending beyond and below the front edge of the lower floor, a frame member, an arched top hinged to the frame member and marginally mating with the upper edges of the side walls and the front of the upper floor in sealed relation, extension movable to a position over said hitch member and co-planar with the upper floor for cooperating with the upper floor to provide room for a mattress and to provide access to said storage space, means for supporting the extension relative to the hitch whereby strains thereon are borne directly by the hitch, means for holding the top lid in a raised position to permit the extension to be located within the boundaries of the upper floor and forming a rain shed over the upper floor, and fabric means secured under the front edge of the top and to the outer end of extension to provide a rain shed over the extension.

15. In a trailer having two road wheels adjacent the rear end thereof, a frame supported in part by the wheels and having a hitch portion, a body on the frame including a raised floor, an extensible portion for said floor, a yoke means supported at a single point on the hitch portion of the frame and supporting said extension at spaced points, and means supporting the front portion of the trailer.

16. In a trailer, longitudinally spaced food and bed compartments and storage means extending beneath both the bed and food compartments.

17. In a trailer, a main floor, a second floor spaced from the main floor and providing a compartment therebetween, means for storing kitchen supplies at the rear of the compartment, an extensible bed removably stored on said second floor, means affording access to the compartment under the bed including the removal of the bed, a front deck raisable over the bed to provide head room and sleeping quarters, and a raisable deck over the food storing means operable independently of the front deck to afford a second access to the compartment at the rear thereof independently of the removal of the bed.

18. In a trailer having a storage compartment running fore and aft, storage means above said compartment, deck means covering the fore part of said compartment and storage means for converting said storage means into sheltered sleeping quarters when raised, deck means covering the aft part of the compartment and storage means for providing shelter for cooking operations when raised, and common means for supporting said deck means.

19. In a trailer having superposed luggage and bed equipment storage compartments fore and a food compartment aft through which access may be had to the luggage compartment, a support member, a plurality of decks hinged to the support member for movement about proximate axes to convert the bed equipment storage compartment into sheltered sleeping quarters fore and shelter for cooking aft when the decks are raised.

20. A trailer comprising a bed and side walls defining a compartment, a removable transverse member connecting the sides intermediate their ends and serving as a water shed, two upwardly opening top members hinged relative to said member to cover the open ends of the compartment, said upwardly opening top members shedding water to said water shed when in raised position.

21. A trailer comprising a bed and side walls defining a compartment, a removable transverse member connecting the sides intermediate their ends, removable means for storing supplies at the rear of the compartment, an extensible bed removably supported at the top of the sides at the forward end of the compartment, a front deck hinged to said transverse member to provide sleeping quarters over the bed; and a raisable deck hinged to the transverse member over the supplies to provide shelter therefore when raised.

22. In a trailer having two road wheels adjacent the rear end thereof, a frame supported in part by the wheels and provided with a narrow hitch portion at the front, a body on the frame including a raised floor, said floor having a forwardly extensible portion and shelter, means detachably engaging the hitch at a single point beyond the body for supporting said extension at a plurality of points spaced laterally of the hitch, and means for supporting the hitch and the front portion of the trailer.

23. In a trailer having two wheels and side walls disposed substantially in the plane of the wheels and apertured to receive the top portions of the wheels for free movement between the walls and wheels under running conditions, a floor joining the side walls at the bottom and apertured co-extensively with the walls to clear the wheels, a housing over each wheel sealing the borders of the apertures and defining the wheel space, each housing providing a support point spaced from the floor, and an arched frame member interconnecting the top of the side walls at the support point and readily removable as a unit.

24. In a trailer having two wheels and side walls disposed substantially in the plane of the wheels and apertured to receive the top portions of the wheels for free movement between the walls and wheels under running conditions, a floor joining the side walls at the bottom and apertured co-extensively with the walls to clear the wheels, a housing over each wheel defining the wheel space, each housing providing a point of support spaced from the floor, deck means for covering the floor in front of the said spaced points, deck means for covering the trailer in the rear of said spaced points and an arched frame member supporting said deck means and interconnecting the top of the side walls at the support points, said arched frame member and said deck means being readily removable as a unit.

25. In a trailer having a floor and contiguous side and front walls, the combination of an arched frame member extending across one side wall to the other intermediate the edges of said trailer and of a height appreciably less than the shoulders of a man of average stature, and top members hinged to said frame member defining the front, top and rear of said trailer when closed and providing access to the interior of said trailer when raised, said arched frame member and said top members being readily removable as a unit.

26. In a trailer having two road wheels adjacent one end thereof, a frame supported in part by the wheels, a body on the frame including a raised floor, said frame having a narrowed portion extending beyond the body, an extensible portion for said floor disposable over the narrowed portion, yoke means supported at a single point on the narrowed portion against lateral and downward movement and supporting said extension at spaced points, and means for supporting the narrowed portion of the frame.

CARL S. HORNBERGER.